Figure 1:
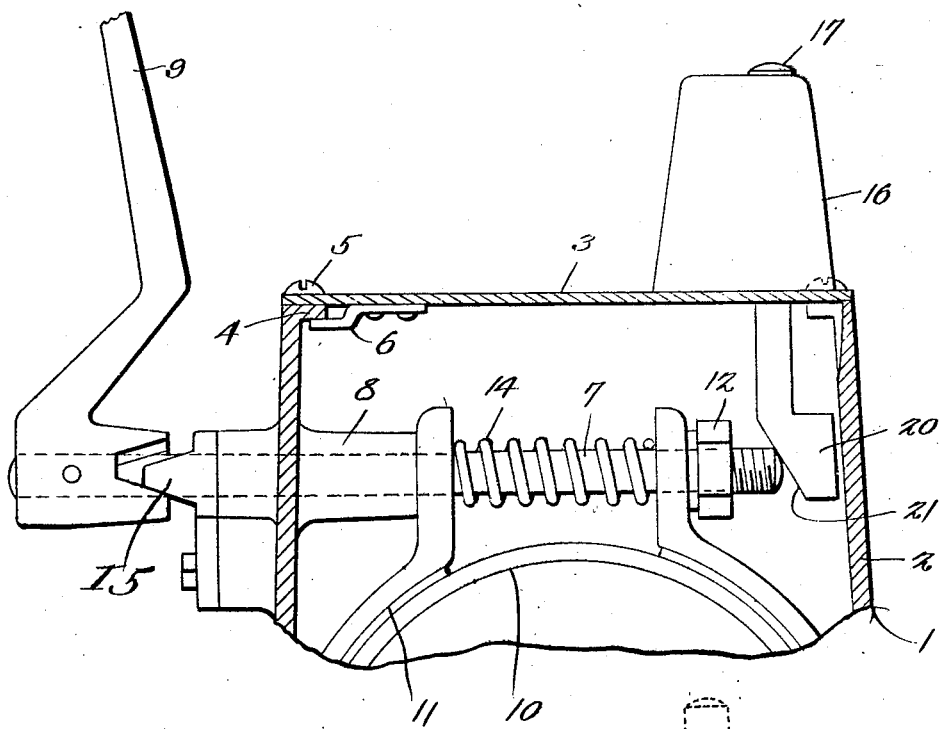

March 31, 1925. 1,531,441
O. F. IMMELL
AUTOMOBILE TRANSMISSION LOCK
Filed March 13, 1924  2 Sheets-Sheet 2

Inventor
O. F. Immell
By C. A. Snow & Co.
Attorneys

Patented Mar. 31, 1925.

1,531,441

UNITED STATES PATENT OFFICE.

OMER F. IMMELL, OF BLAIR, WISCONSIN.

AUTOMOBILE TRANSMISSION LOCK.

Application filed March 13, 1924. Serial No. 699,029.

*To all whom it may concern:*

Be it known that I, OMER F. IMMELL, a citizen of the United States, residing at Blair, in the county of Trempealeau and State of Wisconsin, have invented a new and useful Automobile Transmission Lock, of which the following is a specification.

This invention aims to provide novel means whereby the driver of a car can lock the brake mechanism in such a position that the brake mechanism will be held applied, thereby rendering theft of the car difficult.

It is within the province of the disclosure to improve generally and to enhance the utility of the device of the type to which the invention appertains.

In the drawings a preferred embodiment of the invention has been shown, but a mechanic, working within the scope of what is claimed, may make changes, without departing from the spirit of the invention.

In the accompanying drawings:—

Figure 2:
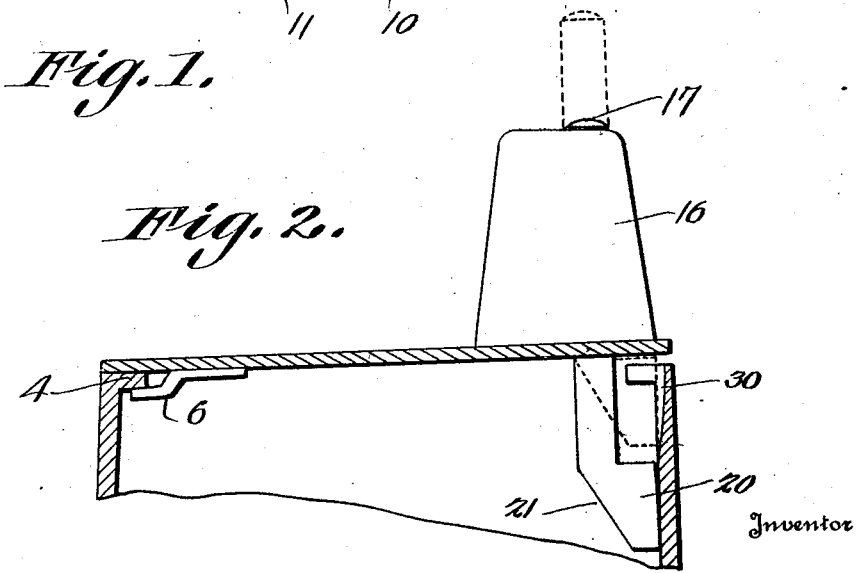
Figure 3:
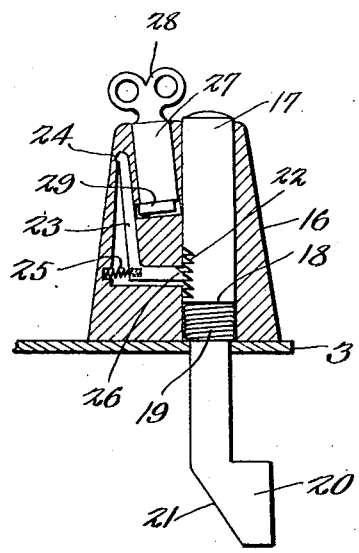
Figure 4:
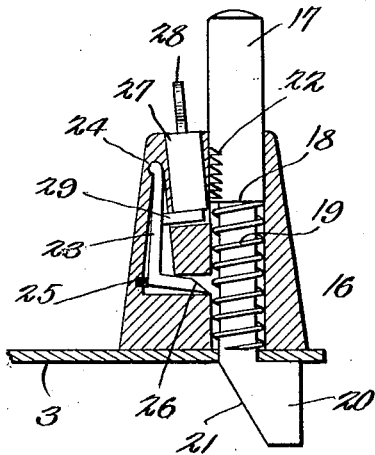
Figures 5, 6:
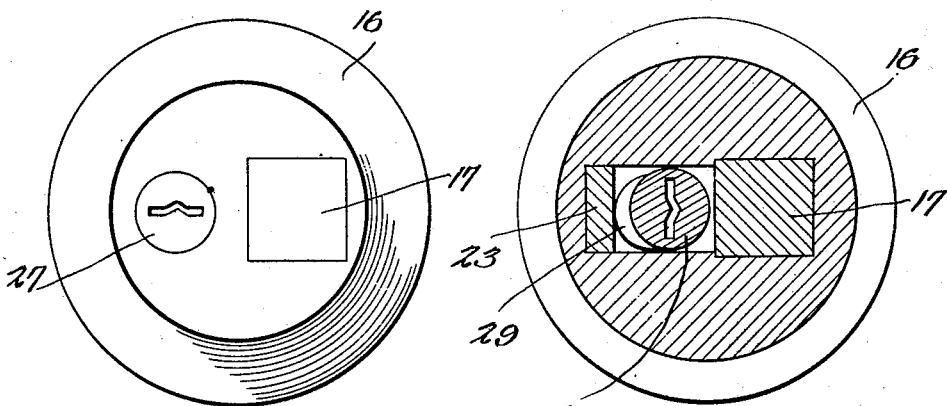

Figure 1 shows in section, a portion of a transmission casing whereunto the device forming the subject matter of the application has been applied; Figure 2 is a view similar to Figure 1, but showing the process of removing the cover of the transmission casing; Figure 3 is a sectional view taken through the locking mechanism, the bolt being advanced; Figure 4 is a view similar to Figure 3 but showing the bolt retracted; Figure 5 is a top plan of the lock casing; Figure 6 is a transverse section taken through the lock casing.

In the drawings, the numeral 1 designates the transmission casing of a Ford automobile, the casing comprising a body 2 and a cover 3. The body 2 of the transmission casing has the usual flanges 4 in which the cover 3 is attached by securing elements 5, such as screws. The cover 3 is equipped with a keeper 6, adapted to engage beneath one of the flanges 4.

The numeral 7 designates a shaft mounted at 8 on the body 2 of the transmission casing for rotation and for longitudinal movement. The shaft 7 is operated by a brake pedal 9. The brake drum is shown at 10. The brake band appears at 11, and the ends of the brake band are mounted on the shaft 7. One end of the brake band 11 abuts against the bearing 8 and the other end of the brake band is engaged by a nut 12 or the like, mounted on the shaft 7. A compression spring 14 is mounted on the shaft 7 and is located between the ends of the brake band 11. The numeral 15 indicates means whereby, when the shaft 7 is rotated through the instrumentality of the pedal 9, longitudinal movement will be imparted to the shaft, to tighten the brake 11, on the drum 10. The brake construction as outlined is common and well known, being a part of the standard Ford car construction.

In carrying out the invention, a support or casing 16 is mounted on the cover 3 of the transmission casing 1. A locking bolt 17 is mounted for reciprocation in the support 16 and in the transmission cover 3. The bolt 17 has a shoulder 18 located within the support 16, one end of a spring 19 abutting against the shoulder 18 on the bolt 17, to elevate the bolt as shown in Figure 4, until a laterally extended foot 21 on the bolt is engaged with the cover 3. The foot 20 of locking bolt 17 is supplied with an inclined edge 21. The locking bolt 17 has a rack 22 located adjacent to the shoulder 18. An angular pawl 23 is pivotally mounted, as at 24, at one end, in the support 16. The pawl 23 is swung forward, toward the locking bolt 17, through the instrumentality of the compression spring 25 interposed between the support 16 and the angle of the pawl 23. At its inner end, the pawl 23 is beveled as at 26, for cooperation with the rack 22 on the locking bolt 17. At 27 there appears the casing of a lock, the lock being adapted to be operated by a key 28, the locking mechanism including an arm 29, a cam or the like, adapted to be rotated into engagement with the upright portion of the pawl 23, by way of the key 28, when the key is inserted into the lock casing 27. The details of the locking mechanism are not shown because I am aware of the fact that a specific kind of locking mechanism cannot be claimed in this application.

In practical operation, the brake band 11 is set tightly upon the brake drum 10 by way of a brake pedal 9, in the usual manner. The operator pushes the bolt 17 downwardly into the position shown in Figures 3 and 1, the beveled edge 21 of the foot 20 engaging the end of the shaft 7, so that the shaft cannot move endwise, the brake band 11 being held engaged with the brake drum 10. When the bolt 17 is thrust downwardly, the pawl 23 under the action of the spring 25 cooperates with the rack 22 on the bolt 17 and the bolt 1 and the bolt is held in the position shown in Figures 3 and 1 of the drawings. The operator may insert the key 28 into the lock 27 and rotate the arm or cam 29, until the arm or cam engages the pawl 23 and when the pawl is out of engagement with the rack 22 on the bolt 17, the bolt will move upward, under the action of the spring 19, thus setting the shaft 7 free, whereupon the brake band 11 will release itself from the brake drum 10, responsive to the spring 14.

Note Figures 1 and 2. Even though the usual securing elements 5 be removed, the cover 3 cannot be detached from the body 2 of the transmission casing 1, if the bolt 17 is advanced as shown in Figure 2, because the foot of the bolt will beat against one side of the casing. When, however, the bolt 17 is retracted into the position shown in Figure 4, and in Figure 2 in dotted line, the cover 3 may be detached from the body 2, one side wall of the body 2 of the casing 23 having a notch 30 through which the foot 20 of the bolt 17 may pass when the adjacent edge of the cover 3 is swung upwardly as indicated in Figure 2.

Having thus described the invention, what is claimed is:—

1. In a device of the class described, a casing, a drum rotatable in the casing, a shaft mounted for rotation in the casing, a band assembled with the shaft and cooperating with the drum, means for moving the shaft longitudinally, to tighten the band, when the shaft is rotated, and means under the control of an operator for limiting the longitudinal movement of the shaft, thereby to hold the band set on the drum.

2. In a device of the class described, a casing, a drum, rotatable in the casing, a shaft mounted for rotation in the casing, a band cooperating with the drum and assembled with the shaft, means for moving the shaft longitudinally, to tighten the band, when the shaft is rotated, a locking bolt slidably in the casing, into and out of the path of the shaft, thereby to limit the longitudinal movement of the shaft and to hold the band set on the drum, and mechanism under the control of an operator for holding the bolt in engagement with the shaft.

3. In a device of the class described, a casing, a drum rotatable in the casing, a shaft mounted for rotation in the casing, a band cooperating with the drum and assembled with the shaft, means for moving the shaft longitudinally, to tighten the band, when the shaft is rotated, a bolt slidable in the casing, into and out of engagement with the shaft, the bolt being provided with a rack, a pawl movably mounted and adapted to cooperate with the rack, to hold the bolt advanced with respect to the shaft key-operated means for disengaging the pawl from the rack and spring means for moving the bolt out of engagement with the shaft after the pawl has been detached from the rack.

In testimony that I claim the foregoing as my own, I have hereto affixed my signature in the presence of two witnesses.

OMER F. IMMELL.

Witnesses:
JOHN C. GAVENEY,
ZELDA MERGENER.